(12) United States Patent
Weber et al.

(10) Patent No.: US 9,050,876 B2
(45) Date of Patent: Jun. 9, 2015

(54) CAM MECHANISM

(75) Inventors: Jens Weber, Sonneberg (DE); Yves-Antoine Rogard, Toulon (FR)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 755 days.

(21) Appl. No.: 13/388,157

(22) PCT Filed: Jul. 30, 2010

(86) PCT No.: PCT/EP2010/061077
§ 371 (c)(1), (2), (4) Date: Sep. 7, 2012

(87) PCT Pub. No.: WO2011/012688
PCT Pub. Date: Feb. 3, 2011

(65) Prior Publication Data
US 2012/0318079 A1 Dec. 20, 2012

(30) Foreign Application Priority Data
Jul. 31, 2009 (DE) .......................... 10 2009 035 551

(51) Int. Cl.
*F16K 31/524* (2006.01)
*F16H 25/14* (2006.01)
*B60H 1/00* (2006.01)

(52) U.S. Cl.
CPC .......... *B60H 1/0065* (2013.01); *B60H 1/00857* (2013.01); *Y10T 74/18288* (2015.01)

(58) Field of Classification Search
CPC ...... G02B 15/14; G02B 7/04; G03G 21/1647; G03G 2221/1657; G03G 2221/169; H01R 13/62938; H01R 13/62966; B23Q 3/1554; B23Q 16/021; B23Q 16/06; B21D 22/18; B60H 1/00857; F01L 13/0036; F01L 1/02; F01L 1/04; F16H 37/16; F16H 25/16; F16H 21/28; F16H 25/125; F16H 53/08
USPC ........... 74/54, 53, 57, 88, 89, 579–598, 570.1
See application file for complete search history.

(56) References Cited

U.S. PATENT DOCUMENTS 1,979,195 A * 10/1934 Govare et al. ..................... 74/55
2,634,670 A * 4/1953 Simons .......................... 454/159

(Continued)

FOREIGN PATENT DOCUMENTS

| DE | 19928834 A1 | 12/2000 |
| FR | 2757240 A1 | 6/1998 |

OTHER PUBLICATIONS

English language abstract and machine-assisted translation for DE 19928834 extracted from the espacenet.com database on Jul. 9, 2012, 17 pages.

(Continued)

*Primary Examiner* — William Kelleher
*Assistant Examiner* — Valentin Craciun
(74) *Attorney, Agent, or Firm* — Howard & Howard Attorneys PLLC

(57) ABSTRACT

The invention concerns a cam mechanism (10), in particular for the actuation of ventilation valves of a vehicle ventilation system with a revolving cam disc (12) which has on one of the disc faces two curvilinear guides (16, 18) intersecting in intersection areas (14) as well as two swivelling adjustment levers (20, 22) each with a coupling (24, 26) associated with a curvilinear guide (16, 18). For guiding at least one adjustment lever (20, 22) during its on passage through the intersection areas (14) separate guide elements (32a, 32b, 32c) different from the curvilinear guides (16, 18) and the couplings (24, 26) are provided.

14 Claims, 5 Drawing Sheets

(56) References Cited

U.S. PATENT DOCUMENTS

| | | | | |
|---|---|---|---|---|
| 2,692,509 | A | * | 10/1954 | Gilbson ............................. 74/53 |
| 2,706,415 | A | * | 4/1955 | Curtis ................................ 74/54 |
| 3,001,416 | A | * | 9/1961 | De Kalbermatten ............ 74/527 |
| 3,241,448 | A | * | 3/1966 | Rocha ............................. 89/161 |
| 3,536,570 | A | * | 10/1970 | Holstein ....................... 156/566 |
| 3,869,924 | A | * | 3/1975 | Beezer ............................... 74/24 |
| 4,069,724 | A | * | 1/1978 | Sobotta ........................... 74/569 |
| 4,127,324 | A | * | 11/1978 | Sobotta ......................... 353/116 |
| 4,535,642 | A | * | 8/1985 | Ohmura ............................. 74/58 |
| 4,570,500 | A | * | 2/1986 | Richter ............................. 74/54 |
| 4,592,244 | A | * | 6/1986 | Nagata et al. ..................... 74/57 |
| 4,625,575 | A | * | 12/1986 | Le Bras ............................ 74/63 |
| 4,667,531 | A | * | 5/1987 | Kato et al. ....................... 74/567 |
| 4,876,794 | A | * | 10/1989 | Myers ............................. 30/252 |
| 5,249,916 | A | * | 10/1993 | Portrait et al. ............. 414/798.9 |
| 6,684,723 | B1 | * | 2/2004 | Stöckle ............................. 74/54 |
| 2011/0100144 | A1 | * | 5/2011 | Neelakantan et al. ..... 74/473.36 |

OTHER PUBLICATIONS

English language abstract and machine-assisted translation for FR 2757240 extracted from the espacenet.com database on Jul. 9, 2012, 16 pages.

International Search Report for Application No. PCT/EP2010/061077 dated Sep. 27, 2010, 4 pages.

* cited by examiner

CAM MECHANISM

RELATED APPLICATIONS

This application claims priority to and all the advantages of International Patent Application No. PCT/EP2010/061077, filed on Jul. 30, 2010, which claims priority to German Patent Application No. DE 10 2009 035 551.0, filed on Jul. 31, 2009.

The invention concerns cam mechanisms, in particular for actuating ventilation valves in a vehicle ventilation system, with a revolving cam disc, which has on the side of the disc, in a mutually intersecting area, two curvilinear guides, as well as two swivelling adjustment levers, each with a coupling, each coupling allocated to a curvilinear guide and engaging into the latter.

A generic cam gear is already familiar from FR 2 757 240 A1, where in that patent the curvilinear guides are formed as guide grooves and the couplings as guide pins engaging in the guide grooves. In order to prevent a guide pin from leaving its allocated guide grooves into the intersection area and following another guide groove, the text proposing to make the guide grooves with different groove cross-sections, or different groove depths, where the guide pins are adapted to the section of the allocated guide groove.

At least one of the guide pins is not introduced into a groove intersection area through its allocated guide groove, so that, for example, after the intersection area, on reintroduction into the allocated guide groove, an unwanted hook-up of the guide pin and hence of the adjustment lever concerned, may take place.

The task of the invention is accordingly the provision of a cam mechanism, where the guiding of the adjustment lever in the intersection area of the curvilinear guides is improved.

This task is accomplished by means of a cam mechanism of the type described at the beginning of the present text, where for guiding at least one adjustment lever during its passage through the intersection area, one separate guide element independent of the guides and of the allocated couplings is provided. Since the guiding of the adjustment lever by means of the curvilinear guide and allocated coupling in the intersection area of the curvilinear guides is inadequate and may lead to problems, a guide element is provided in the said critical intersection area, which exerts a type of independent "substitute guiding". In general therefore a continuous guiding of the adjustment lever accordingly results in relation to the cam disc ensured either through the joint action of the curvilinear guides and the respective allocated couplings, or through the separate guide element.

The cam disc, or at least one of the adjustment levers preferably has the guide element, which during passage through the intersection area, comes to rest on a driver engagement sector, on the adjustment lever, or on the cam disc. In this way the critical intersection area is bridged by a substitute guide formed by the guide element and the driver engagement sector.

In an embodiment of the cam mechanism several guide elements linked to the cam disc are allocated to a curvilinear guide, where the guide elements are so arranged that they come to rest on a driver engagement sector in the intersection and before and after the entry of the coupling. The guide elements are preferably formed onto the cam disc. Moreover, several guide elements may lie in a sliding direction, in particular in front and behind the intersection area.

In addition in this embodiment several driver engagement sectors allocated to individual guide elements may be present on the adjustment lever. The driver engagement sectors are preferably formed onto the adjustment lever. Moreover, several driver engagement sectors can be arranged in a sliding direction, in particular in front and behind the coupling.

In a further embodiment of the invention the curvilinear guides are formed as guide grooves and the couplings as guide pins engaging into the guide grooves. With the exception of the intersection area of the guide grooves, this represents a simple, economical and reliable possibility of actuating several adjustment levers simultaneously but individually, with the help of the driven cam disc.

In this embodiment, a first guide groove has a first average groove width $d_1$ and a second groove a second average groove width $d_2$, where $d_2 <= d_1 < 2d_2$. This means that no or no large groove width differences need be provided between guide grooves, in order to ensure problem-free guiding. By the use of at least one separate guide element, the groove widths and thereby also the diameters of the guide pins can be similar, or even equal, without impairing the guiding of the adjustment lever.

In a further embodiment of the cam mechanism, a first guide groove has a first groove depth $t_1$ and a second guide groove a second groove depth $t_2$ where $t_2 > 1$.

Particularly preferred are a second adjustment lever allocated to the second guide groove passing through the intersection area, guided solely through the second guide groove and a first adjustment lever allocated to the first guide grove in the passage of the intersection area by the guide element relatively to the cam disc. Since in the case of different groove depths the guide groove with the greater groove depth offers continuous guidance in the intersection area as well, no separate guide element is needed for guiding this adjustment lever. The adjustment lever which is allocated to the guide groove with the smaller groove depth, is not guided by the groove in the intersection area and accordingly receives in this area "substitute guidance" by the separate guide element.

Further useful embodiments of the invention will become clear from the subsidiary claims.

The invention will hereinafter be described by means of a preferred embodiment shown in the appended drawings.

Figure 1:
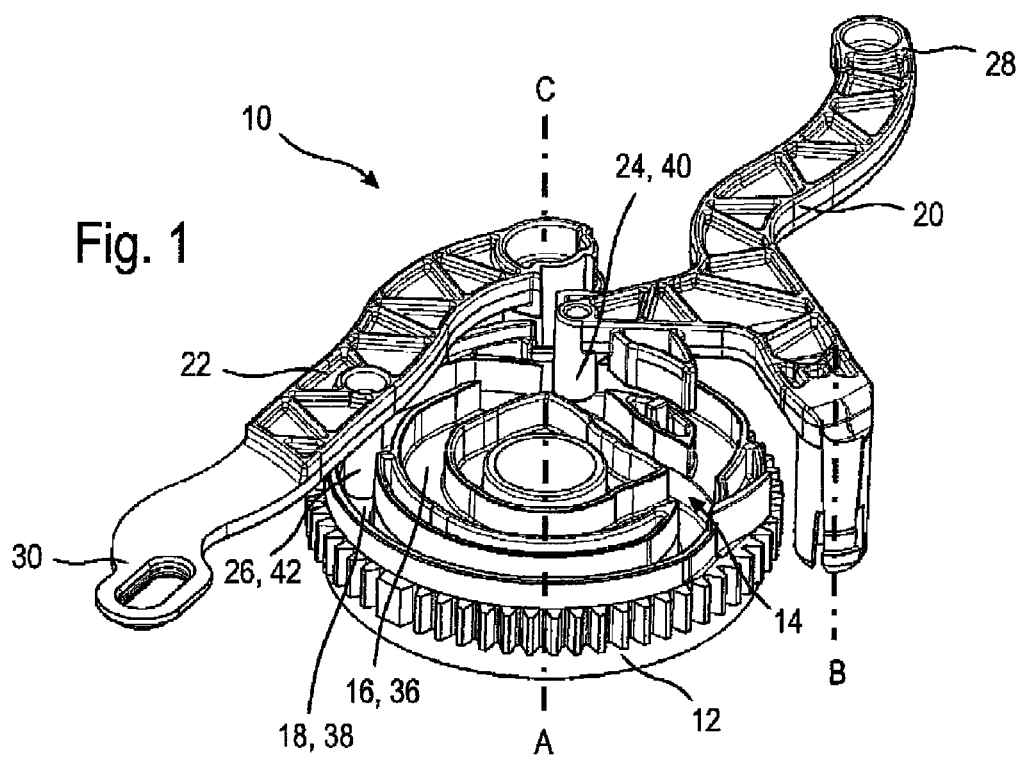
FIG. 1 is a perspective view of a cam mechanism according to the invention.

FIG. 1 shows a cam mechanism 10 with a revolving cam disc 12, which has on one disc face two mutually intersecting curvilinear guides 16, 18 in an intersecting area 14, as well as two swivelling adjustment levers 20, 22, each with a coupling 24, 26 where each coupling 24, 26 is allocated to a curvilinear guide 16, 18 and is in a guide engagement with the latter.

In the embodiment shown, the cam disc 12 is a toothed wheel, which in the operation of the cam mechanism 10 engages with a drive wheel and through it may be rotated about an axis A.

Although the cam disc 12 in FIG. 1 only has on its upper face curvilinear guides 16, 18, it is clear that alternatively or in addition, curvilinear guides with allocated adjustment levers may also be provided on a cam underside.

FIG. 1 shows a first adjustment lever 20, able to be swivelled round a swivelling axis B and a second adjustment lever 22, able to be swivelled round a swivelling axis C, where swivelling axes B, C are substantially parallel to one another, as well as to swivelling axis A of cam disc 12.

The adjustment levers 20, 22 have free ends 28, 30. To these free ends it is possible to couple actuation elements (not shown), which can be simultaneously but individually moved through the cam mechanism 10. Such cam mechanism 10 is, for example, introduced into a vehicle ventilation system in order to actuate ventilation valves, where these correspond to coupled actuating elements.

Figure 2:
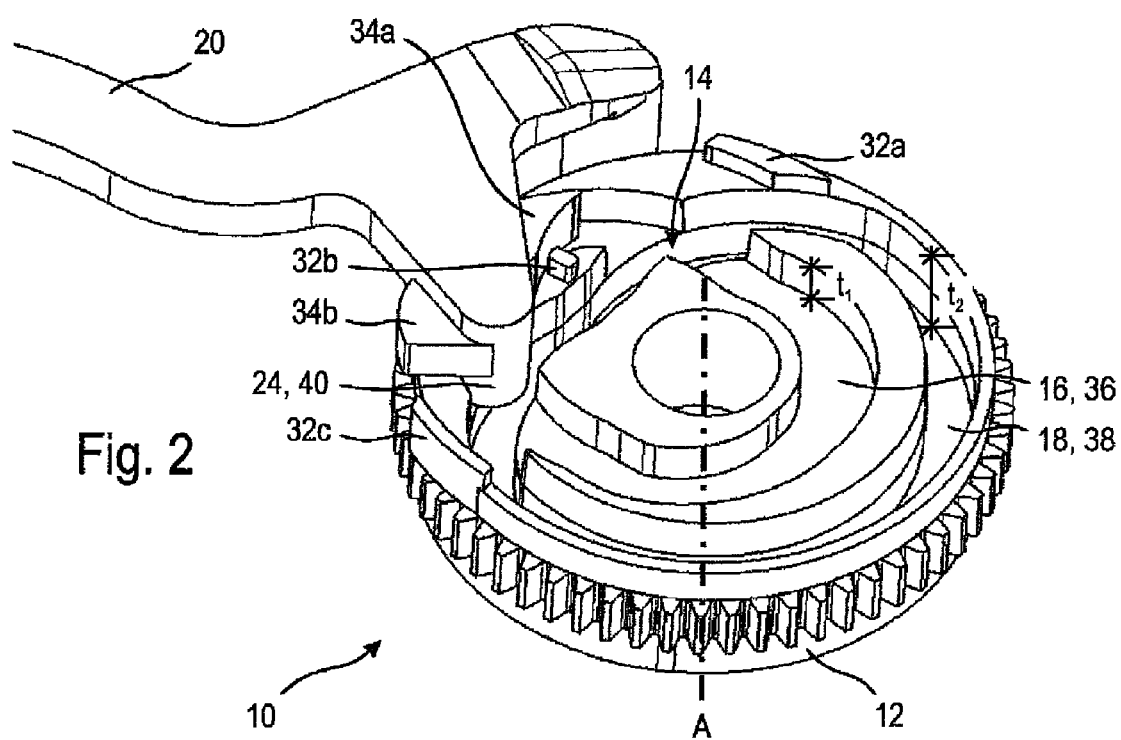
FIG. 2 is a further simplified perspective view of the cam mechanism according to the invention.

As can readily be seen in FIGS. 1 and 2, the curvilinear guides 16, 18 are shaped as guide grooves 36, 38 and the couplings 24, 26 as guide pins 40, 42 which engage into guide grooves 36, 38.

FIG. 2 shows cam mechanism 10 in a somewhat simplified representation, where for reasons of better overview the second adjustment lever 22 has been omitted. The advantages of the cam mechanism 10 are explained in the Figures which follow, taking the first adjustment lever 20 as an example.

In order to ensure satisfactory guiding in the two intersection areas 14 of the mutually intersecting curvilinear guides 16, 18, there are provided for guiding the adjustment lever 20 during its passage of the intersection 14, separate guide elements 32a 32b, 32c and allocated driver engagement sectors 34a, 34b 34c, which are independent of the curvilinear guides 16, 18 and the allocated couplings 24, 26. The said guide elements 32a-c and driver engagement sectors 34a-c are provided on the allocated adjustment lever 20 outside the curvilinear guides 16, 18 on the cam disc 12, or at distance from coupling 24. Some of the said guide elements 32a-c and driver engagement sectors 34a-c can be seen in FIGS. 1 and 2. As the guide of the adjustment lever 20 in the passage of the intersection area 14, the said guide of adjustment lever 20 is shown in simplified form when the coupling 24 allocated to the adjustment lever 20, is located in the intersection area 14 of the curvilinear guides 16, 18.

Figure 3:
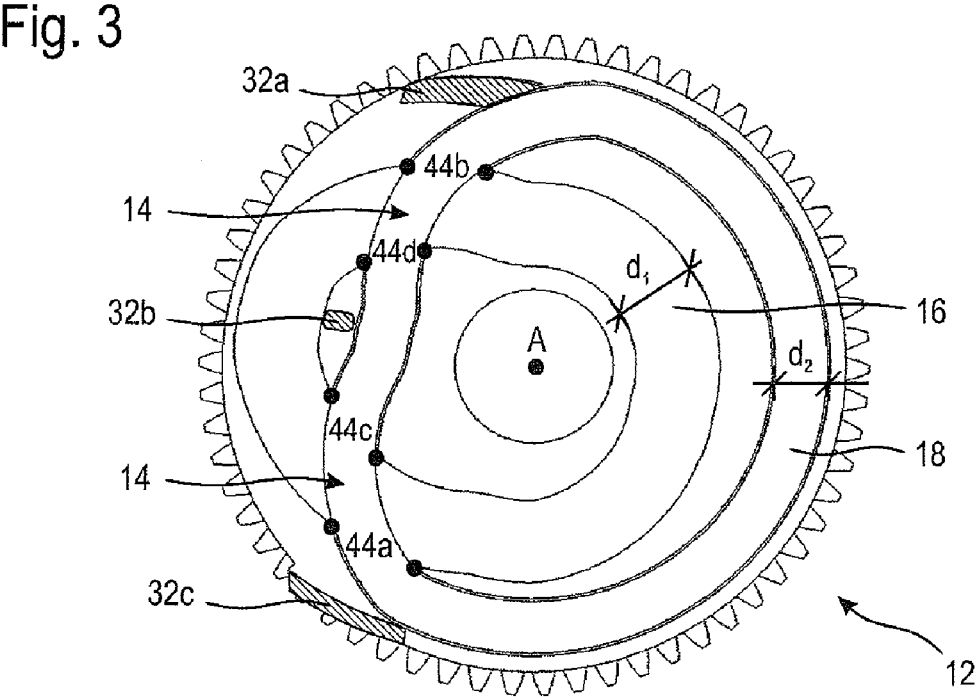
FIG. 3 is a plan view of the cam mechanism according to the invention shown in FIG. 2.
Figure 4:
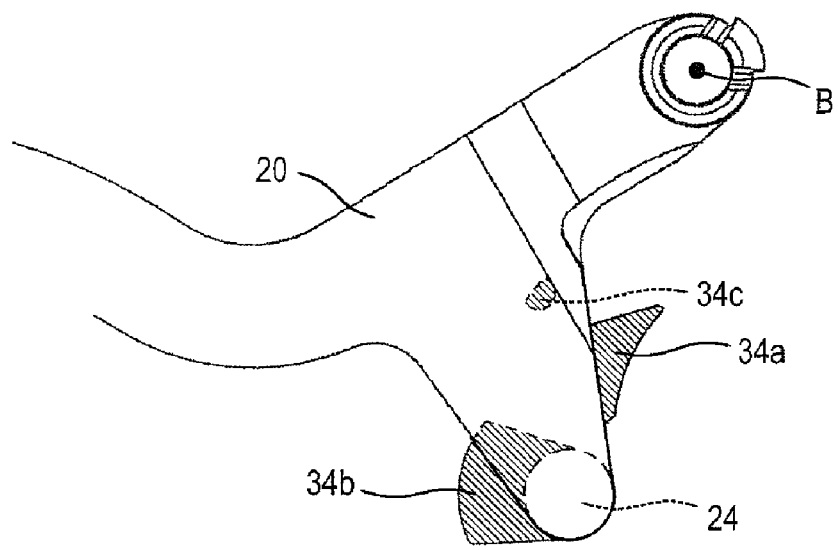
FIG. 4 is a plan view of an adjustment lever of the cam mechanism according to the invention.

FIGS. 3 and 4 are separate plan views of the cam disc 12 and of adjustment lever 20, where all guide elements 32a-c and driver engagement sectors 34a-c arranged on cam disc 12 or on adjustment lever 20, are shown cross-hatched.

As can also be seen in FIG. 2 all guide elements 32a-c of cam disc 12 are shaped as guide projections, extending axially with respect to axis A. In other words, guide elements 32a-c project axially over a surface of cam disc 12 in the direction of the adjustment lever 20. Particularly preferably guide elements 32a-c are formed onto cam disc 12.

FIG. 4 shows driver engagement sectors 34a-c arranged on the (first) adjustment lever 20, which extends in an axial direction so close to the surface of cam disc 12 as axially to overlap guide elements 32a-c of cam disc 12. The sector of the adjustment lever 20 extending axially further in the direction of cam disc 12 as the driver engagement sectors 34a-c and thereby the guide 16 engages more accurately in guide groove 36, is defined as coupling body of adjustment lever 20. Preferably the coupling bodies 24 as well as the driver engagement sectors 34a-c are formed onto the first adjustment lever 20.

With the sole object of ensuring better comprehensibility, the separate guide components are shown separately on cam disc 12 and on adjustment lever 20. The cam disc 12 shows guide elements 32a, 32b, 32c, which on passage through intersection area 14 rest on driver engagement sectors 34a, 34b, 34c and on adjustment lever 20. As can be seen in FIG. 4, driver engagement sectors 34a, 34b, 34c are provided on adjustment lever 20 at a distance from coupling 24. Since the variously marked guide components were unable to exhibit any structural or functional divergences, the guide components arranged on the cam disc could be designated as driver engagement sectors and the guide components arranged on the adjustment lever, as guide elements.

In particular, several guide elements 32a, 32b, 32c linked to cam disc 12 are allocated to the first curvilinear guide 16, where the said guide elements 32a, 32b, 32c are arranged so that they rest on the driver engagement sectors 34a, 34b, 34c before and after the entry of the coupling 24 into the intersection area 14. In the embodiment example in FIG. 4 are provided on the first adjustment lever 20, several driver engagement sectors 34a, 34b, 34c allocated to individual guide elements 32a, 32b, 32c.

With reference to the first curvilinear guide 16 according to FIG. 3, the intersection areas 14 are respectively defined by an outside edge pair 44a, 44b and an inner edge pair 44c, 44d. Since the guide of the first coupling 24 is no longer present in the first curvilinear guide 16, the guiding of the first adjustment lever 20 in these areas will be ensured by jointly acting guide elements 32a, 32b, 32c and driver engagement sectors 34a, 34b, 34c.

For an easier overview of the principle of functioning, FIGS. 5 to 9 represent the guide situation in various rotated positions of cam disc 12 with "active" guide components are cross-hatched.

Figure 5:
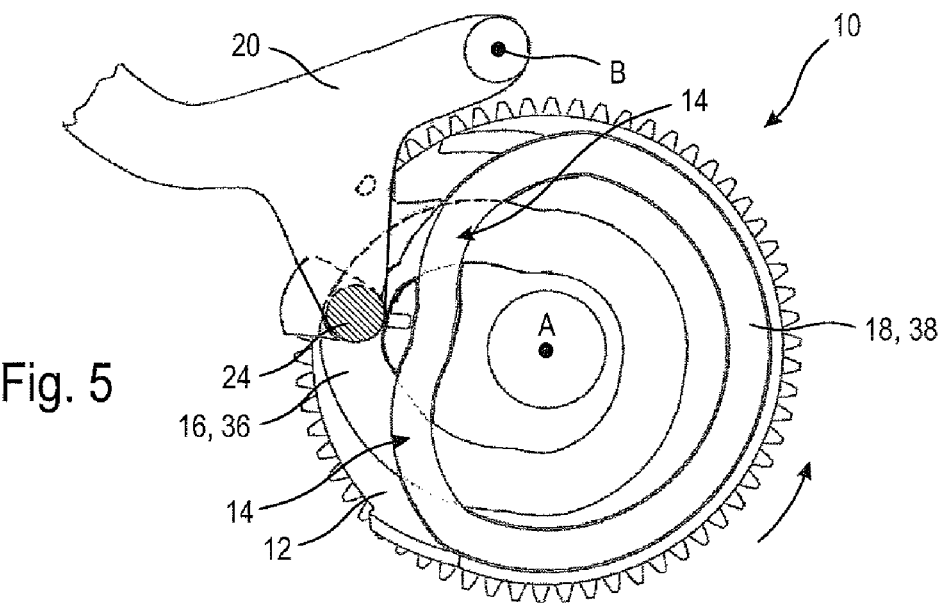
FIG. 5 is a plan view of the cam mechanism in FIG. 2, shown in the start position.

FIG. 5 shows the cam mechanism 10 in a start position and the setting of cam disc 12 to 0°. The coupling 24 of the adjustment lever is in the said start position outside both intersection areas 14 so that the adjustment lever 20 is reliably guided by guide pin 40 engaging in guide groove 36.

Figure 6:
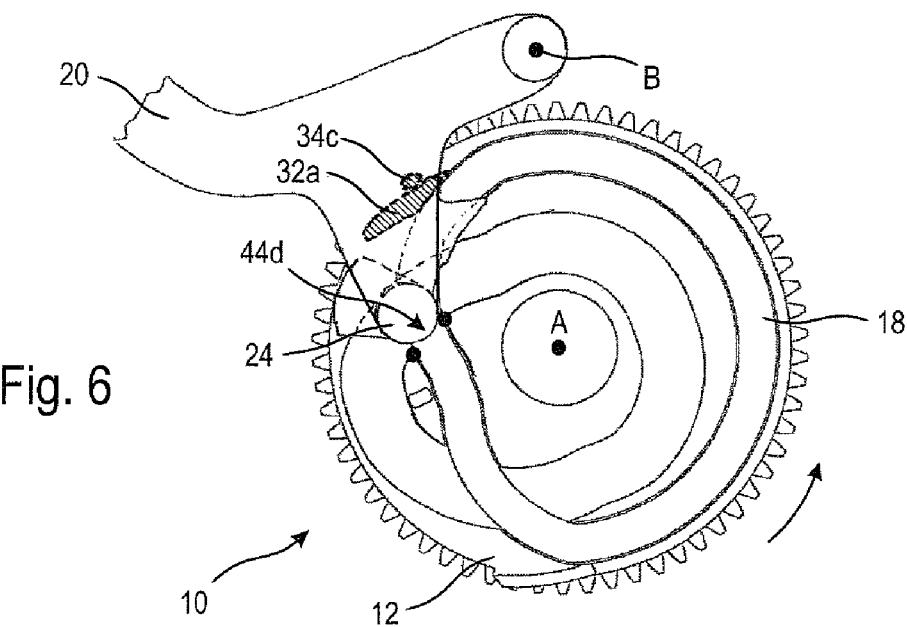
FIG. 6 is a plan view of the cam mechanism in FIG. 2 with the cam disc shown rotated through approximately 30°.

FIG. 6 shows cam mechanism 10 in anticlockwise rotation of the cam disc 12 of approximately 30°. Here, the coupling body is located between the edges of the edge pair 44d and is no longer guided by curvilinear guide 16. In this non-guided area 44d, the guide element 32a and the driver engagement sector 34c are in sliding contact and form a type of substitute guide.

Figure 7:
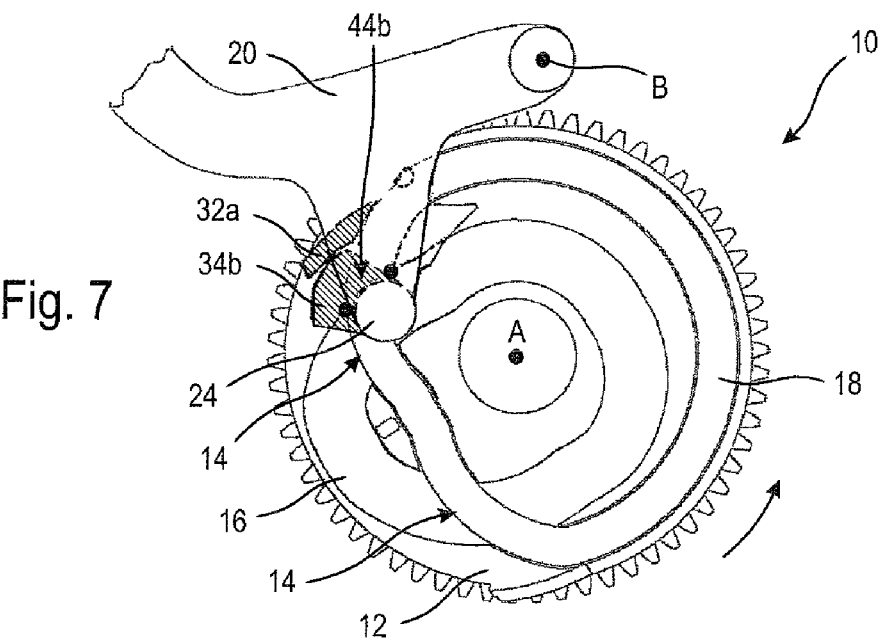
FIG. 7 is a plan view of the cam mechanism in FIG. 2 with the cam disc shown rotated through approximately 55°.

FIG. 7 is cam disc 12 rotated approximately 55° from its start position and coupling 24 is located in edge pair 44b. The missing guide of coupling 24 by the allocated curvilinear guide 16 is bridged by the joint action of the guide element 32a and the driver engagement sector 34b.

Figure 8:
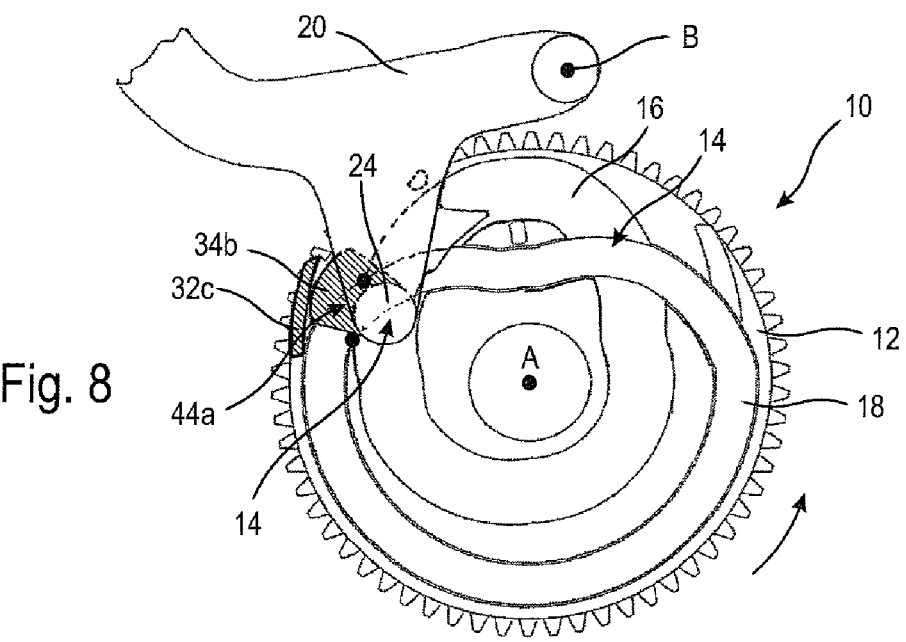
FIG. 8 is a plan view of the cam mechanism in FIG. 2 with the cam disc shown rotated through approximately 290°.

On further anticlockwise rotation of cam disc 12, with a rotation angle of approximately 290°, coupling 24 moves in edge pair 44a (FIG. 8). For a safe guide of adjustment lever 20 In this angle area, guide element 32c and driver engagement sector 32b rest on one another in sliding position.

Figure 9:
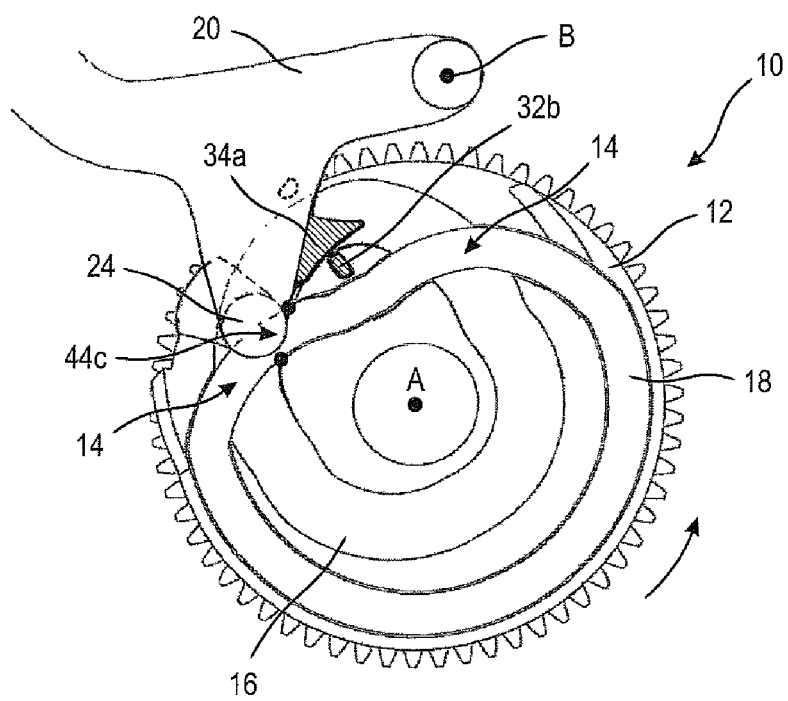
FIG. 9 is a plan view of the disc mechanism in FIG. 2 with the cam disc shown rotated through approximately 330°.

Lastly, FIG. 9 shows cam mechanism 10 with a rotation of the cam disc of approximately 330°. In this area adjustment lever 20 cannot be guided by coupling 24, since it is in edge pair 44c. As a substitute, guide element 32b and driver engagement sector 34a rest on one another to ensure a satisfactory guidance of adjustment lever 20.

Seen via a rotation of cam disc 12, adjustment lever 20 is accordingly continuously guided outside intersection 14 by coupling 24 in guide engagement with curvilinear guide 16 and within the intersection 14 via jointly acting guide elements 32a-c (on cam disc 12) and driver engagement sectors 34a, 34b; 34c (on adjustment lever 20).

With this type of guidance groove width d of guide grooves 36, 38 does not play any part and can be chosen as desired. Particularly preferably, the first guide groove 36 has a first average groove width $d_1$ and the second guide groove 38 a second average groove width $d_2$, where $d_2 <= d_1 < 2d_2$ (cf FIG. 3).

The first guide groove 36 also has a first grove depth $t_1$ and the second guide groove 38 a second groove depth $t_2$, where preferably $t_2 > t_1$ (cf FIG. 2). With adequate axial extension of coupling 26, the second adjustment lever 22 can in this case be guided continuously, that is to say, inside and outside intersection areas 14 by the second coupling 26 engaging in the second guide groove 38. In this way further guide elements need not be arranged either on the cam disc 12, or on the second coupling 26 to guide the second adjustment lever 22. Consequently, on passing through intersection areas 14 the second adjustment lever 22, which is allocated to second guide groove 38, is guided solely by the second guide groove 38 and the first adjustment lever 20 allocated to the first guide groove 36, by guide elements 32a-c relatively to cam disc 12.

The invention claimed is:

1. A cam mechanism for actuating air valves in a vehicle ventilation system, said cam mechanism comprising:
   one revolving cam disc (12) which has on one face two intersecting curvilinear guides (16, 18) in an intersection area (14) as well as two swivelling adjustment levers (20, 22) having couplings (24, 26) wherein each of the couplings (24, 26) is allocated to one of the curvilinear guides (16, 18) and engages in the one of the curvilinear guides (16, 18);
   a plurality of separate guide elements (32a, 32b, 32c) independent of the allocated couplings (24, 26) extending axially from the one face of the cam disc and a plurality of driver engagement sectors (34a, 34b, 34c) on at least one of the adjustment levers (20, 22) for guiding the at least one of the adjustment levers (20, 22) on passage through the intersection area (14).

2. A cam mechanism according to claim 1 wherein the guide elements (32a, 32b, 32c) are provided on the at least one of the adjustment levers (20, 22) outside the curvilinear guides (16, 18) on the cam disc (12) and/or at a distance from the couplings (24, 26).

3. A cam mechanism according to claim 1 wherein the driver engagement sectors (34a, 34b, 34c) are provided on the at least one of the adjustment levers (20,22) at a distance from the couplings (24, 26).

4. A cam mechanism according to claim 1, wherein the guide elements (32a, 32b, 32c) linked to the cam disc (12) are allocated to the one of the curvilinear guides (16, 18) and are so arranged that the guide elements (32a, 32b, 32c) rest on the driver engagement sectors (34a, 34b, 34c) before and after the entry of the couplings (24, 26) into the intersection area (14).

5. A cam mechanism according to claim 4, wherein the driver engagement sectors (34a, 34b, 34c) allocated to the guide elements (32a, 32b, 32c) are present on the adjustment levers (20, 22).

6. A cam mechanism according to claim 1, wherein each of the guide elements (32a, 32b, 32c) is a guide projection.

7. A cam mechanism according to claim 6, wherein the guide projection concerning a revolving axis (A) of the cam disc (12) extends in an axial direction.

8. A cam mechanism according to claim 1, wherein the cam disc (12) has the guide elements (32a, 32b, 32c) which, on passage of the intersection area (14), rests on the driver engagement sectors (34a, 34b, 34c) of the one of the adjustment levers (20, 22), in order to guide the one of the adjustment levers (20, 22) relative to the cam disc (12).

9. A cam mechanism according to claim 1, wherein the cam disc (12) is a toothed wheel.

10. A cam mechanism according to claim 1, wherein an axis of rotation (A) of the cam mechanism and all swivelling axes (B,C) of the adjustment levers (20, 22) are substantially parallel to one another.

11. A cam mechanism according to claim 1, wherein the curvilinear guides (16, 18) are formed as guide grooves (36, 38) and the couplings (24, 26) are formed as guide pins (40, 42) engaging into the guide grooves (36, 38).

12. A cam mechanism according to claim 11, wherein a first guide groove (36) of the guide grooves has a first average groove width ($d_1$) and a second guide groove (38) of the guide grooves has a second groove width ($d_2$), where $d_2 => d_1 < 2d_2$.

13. A cam mechanism according to claim 11, wherein a first guide groove (36) of the guide grooves has a first groove depth (t1) and a second guide groove (38) of the guide grooves has a second groove depth (t2) where t2>t1.

14. A cam mechanism according to claim 13, wherein a second adjustment lever (22) of the adjustment levers allocated to the second guide groove (38) is guided solely by the second guide groove (36) on passage through the intersection area (14), and a first adjustment lever (20) of the adjustment levers allocated to the first guide groove (36) is guided by the guide elements (32a, 32b, 32c) in relation to the cam disc (12) on passing through the intersection area (14).

* * * * *